(No Model.)
W. W. PRITCHETT.
ELECTRIC RAILWAY TROLLEY.
No. 496,280. Patented Apr. 25, 1893.
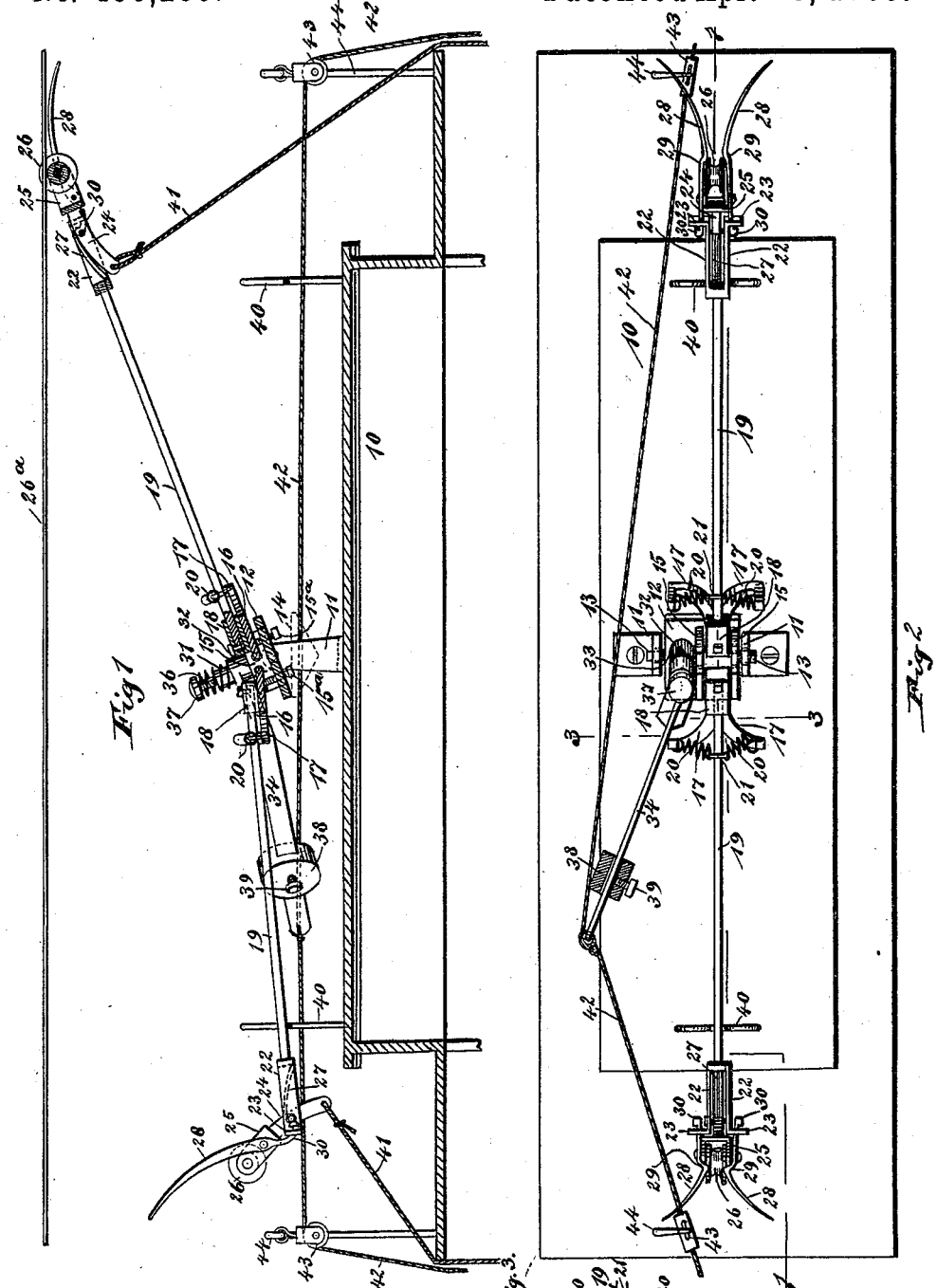
WITNESSES:
INVENTOR
W. W. Pritchett
BY Munn & Co
ATTORNEYS.

UNITED STATES PATENT OFFICE.

WESLEY W. PRITCHETT, OF OGDEN, UTAH TERRITORY.

ELECTRIC-RAILWAY TROLLEY.

SPECIFICATION forming part of Letters Patent No. 496,280, dated April 25, 1893.

Application filed November 2, 1892. Serial No. 450,733. (No model.)

*To all whom it may concern:*

Be it known that I, WESLEY W. PRITCHETT, of Ogden, in the county of Weber and Territory of Utah, have invented a new and Improved Trolley for Electric Cars, of which the following is a full, clear, and exact description.

My invention relates to improvements in trolleys for electric railways, and especially to the trolley mechanism which is carried on the top of a car and adapted to make electrical contact with an overhead wire.

The object of my invention is to produce a simple and cheap trolley mechanism which is constructed in such a way that the trolley wheel will always be held in contact with its wire, which is provided with guide arms adapted to guide the trolley wheels of the wire when the wheel is to be applied; to provide a shifting weight adapted to hold the trolley wheel in contact with the line wire, to provide means for shifting the weight and trolleys when the car is to be reversed or switched, and to construct and arrange the mechanism so that it may be conveniently and quickly operated from the platform of the car and in such a way as to cause the lights in the car to be but momentarily put out when the car is reversed or switched.

To these ends my invention consists in certain features of construction and combinations of the same, as will be hereinafter described and claimed.

Reference is to be had to the accompanying drawings forming a part of this specification, in which similar figures of reference indicate corresponding parts in all the views.

Figure 1 is a sectional elevation on the line 1—1 in Fig. 2, of the trolley mechanism embodying my invention, showing it applied to a car top and to an electric wire. Fig. 2 is a plan view of the same with parts in section. Fig. 3 is a detail cross section on the line 3—3 in Fig. 2; and Fig. 4 is a detail plan view of the trolley pole supporting brackets, and their supports and connections with the trolley poles.

In the drawings, 10 represents the top of the car near the center of which are upwardly extending parallel hangers 11 in which is journaled a rocker plate 12, this plate having end trunnions 13 which are journaled in the hangers. The rocker plate is arranged to swing in a vertical plane, and the plate is prevented from tilting too far by a block 14 which is secured to one of the hangers beneath the plate. The plate is provided near one end with parallel upwardly extending flanges 15 between which are pivoted oppositely extending brackets 16, each bracket being permitted to swing vertically and having at its free end diverging arms 17 which provide means for a spring connection with a trolley pole, as described below. Pivoted on each bracket, near its inner end, is a socket 18 in which the trolley pole 19 is held, and the trolley poles thus extend in opposite directions and are arranged parallel with the length of the car.

Extending upward through the rocker plate 12 and impinging on the under side of the bracket 16, are set screws 15ª, by which the pitch of the brackets and consequently of the trolley poles 19 may be regulated. The trolley poles are held centered by springs 20, the outer ends of which are secured to the ends of the arms 17, and the inner ends of which are secured to rings 21 through which the trolley poles 19 extend. The outer end of each trolley pole terminates in a fork 22, the free ends of each member of the fork being bent oppositely outward, as shown at 23, and these flanges or bent ends 23 form supports for the spring guide arms of the trolley, as described below. Between the members of the fork 22 is pivoted the shank 24 of the trolley bracket 25, which bracket is of a U-shape and has the trolley wheel 26 pivoted in it so as to run upon the wire 26ª. The shank 24 is normally pressed downward by a spring 27 which is secured in the fork 22 at one end and presses with the other upon the shank, and the pressure of the spring holds the trolley wheel in close contact with the wire and lifts the wheel and the guide arms 28 when the trolley wheel is out of contact with the wire, and these arms thus serve to guide the wheel to the wire.

The guide arms 28 are made of spring material and they are secured to opposite sides of the bracket 25. The arms are bent inward at a point near the outer portion of the trolley wheel 26, and the outer portions of the arms diverge, consequently, when either of the arms strike the wire, it guides the wheel upon it and the inner bends 29 prevent the wire from passing down the sides of the wheel. The lower ends of the guide arms 28 extend below their pivots and are bent, as shown at 30, so as to enter slots in the under side of the flanges 23 of the fork 22. This construction stiffens the arms and also assists in holding them in place.

Fixed to the rocker plate 12, near one side, is an upwardly extending post 31, the base portion 32 of which is enlarged and provided with notches 33. An outwardly extending lever 34 is pivoted on the post 31 and this lever is provided with teeth 35 which are adapted to engage the notches 33 and hold the lever in place, but the notches are not so deep as to interfere with the shifting of the lever when it is pulled by a rope, as hereinafter described.

The lever 34 is pressed downward, so that the teeth will engage the notches 33, by a spring 36 which is coiled around the upper portion of the post 31 and around a screw 37, the head of which serves as an abutment for the spring. On the lever 34 is a sliding weight 38 which is held to the lever by a set screw 39. It will be seen by reference to Figs. 1 and 2, that when the lever extends in a direction nearly parallel with one of the trolley poles 19, it will tilt the rock plate 12 and raise the opposite pole 19 so as to bring one of the trolley wheels 26 into contact with the wire 26$^a$, and the weight is heavy enough to hold the trolley in close connection with the wire. When the car is to be reversed, however, the lever 34 is swung around to the opposite side of the rock plate 12, and the plate is tilted and the other trolley raised.

Near the ends of the car and on the top are rests or supports 40 in which the depressed trolley pole 19 rests. To remove the trolleys from the wires, ropes 41 are used in the ordinary way, but the ropes, instead of being connected with the poles, are attached to the shanks 24 of the trolley brackets 25. The ropes 41 extend downward to the car platform in the usual way. Another rope 42 extends longitudinally above the car and is secured to the free end of the lever 34, the rope passing over guide pulleys 43 which are hung in supports 44 on the car top, and the ends of the rope pass downward to the car platforms. The current is transmitted from the wire 26$^a$ through the trolley and to the car motors, in the usual way.

It will be seen from the foregoing description that the poles 19 may be adjusted so as to have just the pitch desired, and the weight 38 will cause one trolley to be held in close contact with the wire and that by shifting the weight the trolley may be reversed; that is, the trolley which has been in contact with the wire will be depressed and the other one raised.

To tilt the trolleys and change their relative positions, it is only necessary to pull on the rope 42 hard enough to swing the lever 34 around into the opposite position to that in which it happens to be, and it will be understood that the tension of the trolley on the wire may be regulated by the position of the lever and weight. The springs 20 permit the trolley poles to have any necessary sway, and if the trolley wheel bounces away momentarily from the wire 26$^a$, the guide arms 28 cause it to be immediately and accurately returned.

Having thus described my invention, I claim as new and desire to secure by Letters Patent—

1. A trolley for electric cars, comprising a trolley pole adapted to be supported on a car and having a fork at its upper end, the bracket terminating in diverging flanges, a trolley bracket having a trolley wheel pivoted therein and a depending spring-depressed shank pivoted in the pole fork, and diverging guide arms pivoted to opposite sides of the trolley bracket, the arms having inner bends opposite the face of the trolley wheel and having depending lower ends arranged to engage slots in the flanges of the pole fork, substantially as described.

2. The combination with a car, of a tilting rock plate pivoted on the car top, oppositely extending trolley poles carried by the rock plate and having trolleys at their ends to engage a wire, and mechanism for holding either of said trolleys in engagement with the wire, substantially as described.

3. The combination with the car, of a tilting rock plate carried on the car top, oppositely extending trolley poles carried by the rock plate and having trolleys at their outer ends to engage the line wire, and a swinging weighted lever carried by the rock plate and adapted to extend nearly parallel with either of the trolley poles, substantially as described.

4. The combination with the car, of a rock plate pivoted thereon, oppositely extending trolley poles carried by the rock plate and having trolleys at their ends to engage a line wire, a swinging weighted lever carried by the rock plate and adapted to extend either forward or backward therefrom, and a fastening device to fix the position of the lever, substantially as described.

5. The combination with the car, of a rock plate pivoted thereon, oppositely extending trolley poles carried by the rock plate and having trolleys at their outer ends to engage a line wire, a swinging weighted lever carried by the rock plate and adapted to extend forward or backward therefrom, and an adjusting rope secured to the free end of the lever and extending over suitable guide pulleys at each end of the car, substantially as described.

6. The combination with the car, of trolley hangers secured to the car top, a tilting rock plate carried between the hangers, oppositely extending trolley poles pivoted on the rock plate and having trolleys at their outer ends to engage a wire, mechanism for adjusting the pitch of the trolley poles, and a shifting weighted lever adapted to hold the rock plate in tilted position, substantially as described.

7. A trolley for electric cars, comprising a hanger adapted for attachment to a car top, a rock plate held to tilt in the hanger, vertically-adjustable brackets pivoted on the rock plate, oppositely-extending trolley poles pivoted on the brackets and provided with trolleys at their outer ends, springs extending in opposite directions from the trolley poles and secured to the free ends of the brackets, and a weighted lever adapted to tilt the rock plate and hold one of the trolleys in engagement with the wire, substantially as described.

8. In a car trolley, the combination with the tilting rock plate having oppositely-extending trolleys thereon, of a post carried by the rock plate and having notches in its base, and a weighted lever held to swing on the post, the lever having teeth on its under side to engage the post notches, substantially as described.

WESLEY W. PRITCHETT.

Witnesses:
 W. KAY,
 JAMES BUCKLEY.